(12) United States Patent
Williams

(10) Patent No.: US 11,865,878 B2
(45) Date of Patent: Jan. 9, 2024

(54) INNER TUBE

(71) Applicant: American Kenda Rubber Industrial Co., Ltd., Reynoldsburg, OH (US)

(72) Inventor: Caitlyn Williams, Massillon, OH (US)

(73) Assignee: American Kenda Rubber Industrial Co., Ltd., Reynoldsburg, OH (US)

( * ) Notice: Subject to any disclaimer, the term of this patent is extended or adjusted under 35 U.S.C. 154(b) by 0 days.

(21) Appl. No.: 17/736,287

(22) Filed: May 4, 2022

(65) Prior Publication Data

US 2023/0356546 A1 Nov. 9, 2023

(51) Int. Cl.
*B60C 5/00* (2006.01)
*B60C 5/04* (2006.01)

(52) U.S. Cl.
CPC ..................... *B60C 5/04* (2013.01)

(58) Field of Classification Search
CPC .. B60C 5/02; B60C 5/008; B60C 5/10; B60C 5/04; B60C 2200/10; B60C 2200/12
See application file for complete search history.

(56) References Cited

U.S. PATENT DOCUMENTS

| | | | |
|---|---|---|---|
| 11,084,329 B2 | 8/2021 | Uchida et al. | |
| 2011/0123802 A1* | 5/2011 | Chang | B32B 5/26 |
| | | | 428/394 |
| 2014/0230985 A1* | 8/2014 | Merino Lopez | B60C 19/122 |
| | | | 152/503 |

FOREIGN PATENT DOCUMENTS

WO   WO-2020152697 A1 * 7/2020 ............. C08L 15/00

OTHER PUBLICATIONS

ASTM International, Standard Test Method for Determining Gas Permeability Characteristics of Plastic Film and Sheeting, article, Sep. 15, 2015, 13 pages.
ATSM International, Standard Test Methods for Vulcanized Rubber and Thermoplatic Elastomers—Tension, article, 2013, 14 pages.

* cited by examiner

*Primary Examiner* — Cedrick S Williams
(74) *Attorney, Agent, or Firm* — Standley Law Group LLP; James L. Kwak; Adam J. Smith

(57) ABSTRACT

An inflatable elastomeric inner tube having improved air retention properties. Such an inner tube may find use, for example, in a pneumatic tire of a bicycle, motorcycle, automobile or other vehicle.

11 Claims, 5 Drawing Sheets

Table 1

| COMPOUND | GTR (cm3/m2*24h*atm) |
|---|---|
| A | 173 |
| B | 36 |
| C | 60 |
| D | 66 |
| E | 58 |

GAS TRANSMISSION RATE TEST RESULTS

Permanent Extension Set after 300% strain

Table 1

| COMPOUND | GTR (cm3/m2*24h*atm) |
|---|---|
| A | 173 |
| B | 36 |
| C | 60 |
| D | 66 |
| E | 58 |

GAS TRANSMISSION RATE TEST RESULTS

*FIG. 2*

Permanent Extension Set after 300% strain

Table 2

| COMPOUND | EXTENSION SET AFTER PULLING TO 300% Strain, % |
|---|---|
| A | 16 |
| B | 37 |
| C | 25 |
| D | 24 |
| E | 24 |

PERMANENT SET TEST RESULTS

Table 4

| COMPOUND | EXTENSION SET AFTER PULLING TO 300% Strain, % | Gas Transmission Rate (GTR) cm³/m²*24H*atm | % Air Loss over 5 days at 90psi in 25°C tire | % Air Loss over 5 days at 70psi in 40°C tire | % Air Loss over 5% Air Loss over 30 days at 70psi in 40°C tire |
|---|---|---|---|---|---|
| A | 16 | 173 | 8.81 | 7.31 | 33.91 |
| B | 37 | 36 | 3 | - | - |
| C | 25 | 60 | - | 5.56 | 15.96 |
| D | 24 | 66 | - | 4.56 | 14.59 |
| E | 24 | 58 | - | 4.39 | 13.74 |

FIG. 6

INNER TUBE

TECHNICAL FIELD

Embodiments of the inventive concept are directed to inner tubes, such as inner tubes for pneumatic tires, having improved gas retention properties.

BACKGROUND

Inner tubes, particularly inner tubes for pneumatic tires, are well known in the art. Inner tubes normally have a toroidal shape and are designed to encircle a vehicle wheel rim and to fit within a cooperating tire so as to form a vehicle wheel and tire assembly. Inner tubes may be used with many vehicles, including without limitation, lawn and garden equipment, bicycles, motorcycles and automobiles.

An inner tube should be sufficiently strong to withstand the stresses consistent with its use, functional over a potentially wide range of operating temperatures and other environmental conditions, and should retain gas (e.g., air) without an excessive rate of leakage when inflated. An inner tube should also resist stress softening and be able to return substantially to its uninflated shape and size after repeated inflation and deflation cycles. This combination of required characteristics has led to deficiencies in known inner tubes.

Inner tubes are typically made from a flexible elastomer, such as a composition containing butyl rubber, that allows the inner tube to stretch when inflated. However, air molecules are able to naturally permeate through rubber and slowly escape over time, which is why inner tubes (and tires) eventually lose air pressure even in the absence of any leaks, punctures, or other defects. Although this slow escape of air occurs in the case of all known inner tubes, such air loss may be exacerbated in the case of low volume-high pressure inner tubes, such as those used for example, in road bike tires.

Natural air loss through rubber may be mitigated through the use of special rubber compositions having low permeability—i.e., a rubber composition with a very low gas transmission rate. However, while low permeability rubber compositions are known, such compositions generally exhibit poor permanent set characteristics, which renders them unsuitable for use in inner tubes due to the requirement that an inner tube return to its original size and shape over the course of many inflations and deflations.

What is needed, is an inner tube exhibiting both a reduced rate of air loss and the ability to repeatedly return substantially to its original shape and size after many inflation and deflation cycles. Such an inner tube should also resist excessive stress softening and include a balance of low gas permeability and minimal permanent set characteristics that result in optimized inner tube performance. The exemplary inner tube embodiments described herein satisfy this need.

SUMMARY

Exemplary inner tube embodiments according to the inventive concept possess improved air loss characteristics in comparison to known inner tubes, while simultaneously offering the strength and durability necessary to withstand the stresses of use. More specifically, an inner tube according to the inventive concept exhibits a reduced gas transmission rate (GTR), which allows the inner tube to stay inflated for a longer period of time. An inner tube according to the inventive concept further has the ability to endure many inflations and deflations without experiencing an adverse amount of stress softening or permanent set, which allows the inner tube to repeatedly return to its original shape upon deflation.

Exemplary inner tube embodiments are generally comprised of a butyl polymer composition, which may include other ingredients such as, without limitation, fillers and pigments (e.g., carbon black). The butyl polymer composition is adjusted to produce an exemplary inner tube having a gas transmission rate value and permanent set value that fall within a predetermined desirable range of said values.

An optimized range of values for each of an inner tube gas transmission rate, permanent set percentage, and wall thickness has been developed through extensive testing and real-world experience. For example, it has been determined that an inner tube having a gas transmission rate above about 70 $cm^3/m^2$ over 24 hours at atmospheric pressure will lose air (deflate) more quickly than is desired according to the present invention. Similarly, it has been determined that setting the permanent set characteristics of an inner tube at less than about 30% after stretching to 300% strain results in desired shape retention characteristics, while permitting a permanent set value of more than about 30% after stretching to 300% strain has a tendency to result in inner tube defects such as, but not limited to bulges and bubbles. Likewise, it has been determined that an inner tube wall thickness range of between about 0.5-2 millimeters, or more narrowly, between about 0.8-1.2 millimeters, results in an inner tube that is sufficiently durable to withstand the stresses of use while still being lightweight and easily inflatable.

In light of the foregoing understandings, it has been determined that an inner tube having a gas transmission rate of less than about 70 $cm^3/m^2$ over 24 hours at atmospheric pressure, a permanent set value of less than about 30% after stretching to 300% strain, and a wall thickness of between about 0.5-2 millimeters results in a manufacturable inner tube with optimized performance characteristics. More specifically, testing reveals that an inner tube manufactured according to these optimized parameters exhibits up to a 400% improvement in air retention due to reduced permeability, is easily inflatable, returns to its original size and shape after numerous inflation and deflation cycles, and possesses the strength and durability required to endure the stresses of normal use.

Other aspects and features of the invention will become apparent to those skilled in the art upon review of the following detailed description of exemplary embodiments along with the accompanying drawing figures.

BRIEF DESCRIPTION OF THE DRAWINGS

In the following descriptions of the drawings and exemplary embodiments, like reference numerals across the several views refer to identical or equivalent features, and:

FIG. 2 is a table presenting experimentally derived gas transmission rate values and air loss percentages over time for five sample inner tube materials;

FIG. 6 is a table of combined test data relative to various exemplary inner tube materials and exemplary inner tubes produced therefrom.

DETAILED DESCRIPTION OF THE EXEMPLARY EMBODIMENTS

Figure 1:
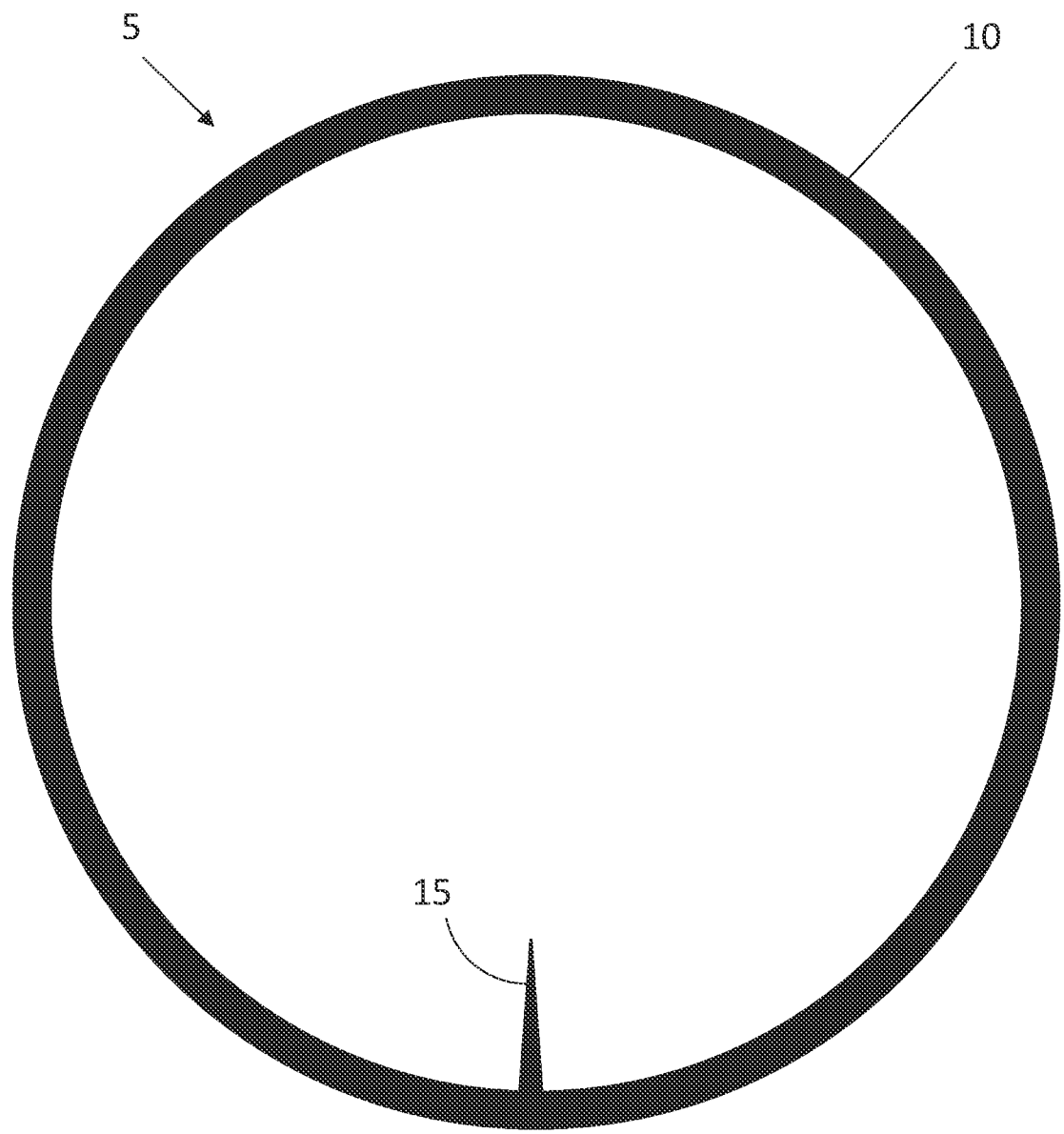
FIG. 1 depicts an exemplary embodiment of an inner tube according to the inventive concept, in the form of a bicycle inner tube of a common size.

One exemplary embodiment of an inner tube 5 according to the present invention is represented in FIG. 1. As shown, the inner tube 5 has an endless tubular wall 10 formed into a generally toroidal shape, with a hollow interior (not shown) into which may be introduced air or another gas to inflate the inner tube. The inner tube 5 also includes a valve stem 15 with an associated valve located therein that provides a gas pathway to the hollow interior of the inner tube.

The particular exemplary inner tube 5 is intended for use in a bicycle tire, but an inner tube according to the invention may be produced in a size and shape that is usable in other applications. For example, and without limitation, an inner tube according to the present invention may be designed for use in a tire of a motorcycle, an automobile, a truck, heavy equipment, and lawn and garden equipment. An inner tube according to the present invention may also be designed and manufactured in different shapes and sizes relative to a given tire category—e.g., a road bike tire, a mountain bike tire, etc.

The present invention is directed to an inner tube with at least improved air retention properties (i.e., a reduced gas transmission rate), which results in an inner tube that will stay inflated for a longer period of time. Consequently, an inner tube according to the present invention includes a gas transmission rate upper limit, or an acceptable gas transmission rate range. It was discovered through experimentation that in order to produce an inner tube with improved air retention characteristics that is also manufacturable and usable, the gas transmission rate (GTR) of the inner tube must also be considered and adjusted in association with other inner tube properties such as permanent set, stress softening, and wall thickness. Thus, as is explained below and evidenced by the test data presented in the drawing figures, producing a practical inner tube with improved air retention properties is not simply a matter of employing a reduced gas transmission rate material, but instead requires a careful balancing of several inner tube properties.

Various experiments were conducted relative to developing an inner tube of the present invention. During the development and testing process, various new inner tube materials were formulated and evaluated to determine the feasibility of manufacturing an inner tube having the desired gas transmission rate and other properties. Samples of new inner tube materials were compared to a known inner tube material, which served as a baseline material. Likewise, exemplary inner tubes produced from these new materials were compared to exemplary inner tubes produced from the known baseline material.

Initially, a film of each new material was produced, as was a film of the known baseline material. Each film was evaluated for its gas transmission rate using a MS-4510 gas permeability tester and according to the standard test method for determining gas permeability set forth in ASTM D1434.

The results of the gas transmission rate testing for the known baseline inner tube material (A) and for four new inner tube materials (B, C, D, E) are presented in Table 1 of FIG. 2. The gas transmission rate of each material is presented in units of $cm^3/m^2$ of gas that passed through each material over a period of 24 hours at atmospheric pressure.

As may be observed from Table 1 of FIG. 2, the gas transmission rate of each of the four new materials (B, C, D, E) is significantly less than the gas transmission rate of the known baseline material (A). Specifically, the gas transmission rate of the new material B is approximately 21% that of the known baseline material A; the gas transmission rate of the new material C is approximately 35% that of the known baseline material; the gas transmission rate of the new material D is approximately 38% that of the known baseline material; and the gas transmission rate of the new material E is approximately 34% that of the known baseline material.

On its face, the test results presented in Table 1 seem to suggest that the new material B should be used to produce an inner tube according to the invention because the new material B clearly has a gas transfer rate that is significantly less than the gas transfer rate of the known baseline material, as well as the other new materials C, D, E. However, as explained below and as represented in the subsequent drawing figures, use of the new material B results in an inner tube lacking various other characteristics/properties required of an inner tube according to the present invention.

As a result of testing and development, it was discovered that permanent set plays an important role in the functionality and performance of an inner tube and, therefore, there is an upper limit to the amount of permanent set exhibited by an inner tube according to the present invention.

Permanent set in an inner tube may be defined as the amount of residual stretch that remains after an inner tube has been stretched for some period of time and then released from the stretching force. In other words, permanent set refers to the difference in the size/shape of the inner tube before and after stretching. An inner tube that exhibits permanent set after stretching will typically have a size that is larger and/or a shape that is different than the size/shape of the inner tube before being stretched.

Excessive permanent set can be problematic in an inner tube because it is desirable for an inner tube to return to its original shape (or very close thereto) after multiple inflations, each of which stretches the inner tube beyond its original shape. Consequently, there is a limit to the amount of permanent set that may be exhibited by inner tube according to the present invention.

The five sample inner tube materials A, B, C, D and E identified in Table 1 of FIG. 2 and discussed above, were further subjected to testing to determine the permanent set characteristics of each material and its possible suitability in the manufacture of an inner tube according to the present invention. During testing, a sample of each material was subjected to repeated stretching using an Instron Tensometer according to the testing method set forth in ASTM F1112-06A. During said testing, each material sample was stretched under tension at a rate of 2 millimeters per second (8% per second based on the size of the samples) until the sample reached a predetermined strain percentage, and was subsequently returned at the same rate to its original state. This stretch-return process was repeated a total of three times for each sample, at strains of 50%, 100%, 200%, and 300%.

Figures 3, 4:
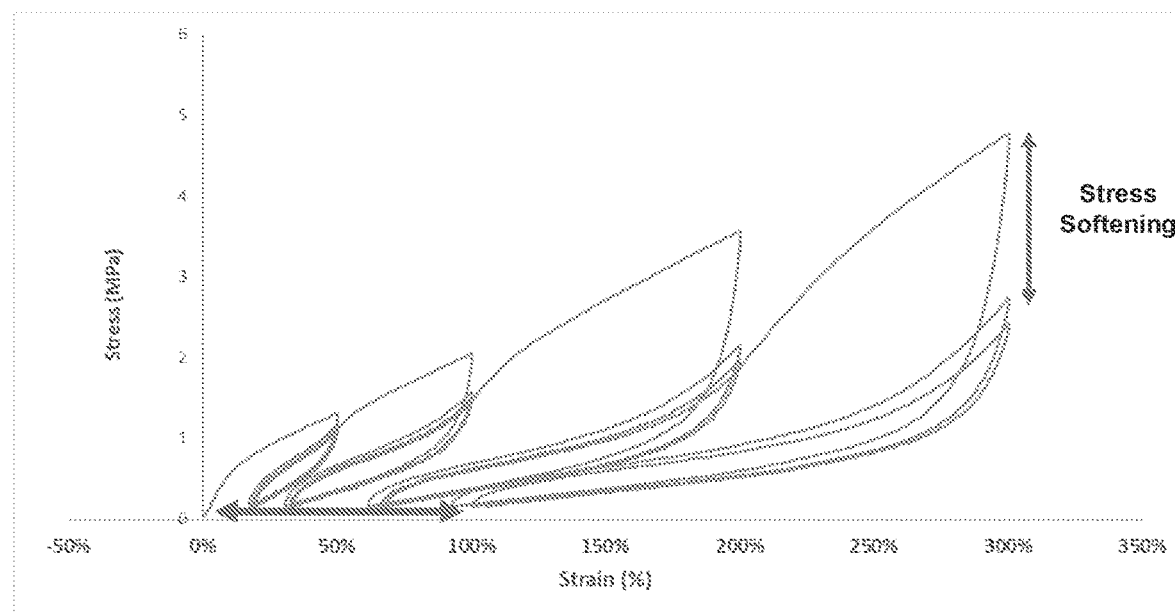
FIG. 3 graphically represents the permanent set experienced by inner tubes constructed of the different sample materials listed in FIG. 2.
FIG. 4 is a table that numerically indicates the values of the permanent set graphically represented in FIG. 3.

The general behavior of the sample materials when subjected to the above-described cyclic stretch testing is graphically represented in FIG. 3. As expected, the amount of stress in the materials increases as the level of strain increases. It is also observable that the amount of stress in the material increases with each stretching cycle at a given strain level. This latter phenomena is also expected and is a result of stress softening (also commonly referred to as the Mullins effect), which would be well understood by one of skill in the art.

The permanent set exhibited by each material sample as a result of this cyclic stretch testing is presented numerically in Table 2 of FIG. 4. As indicated, the known baseline material A had a measured permanent set value of 16; the new material B had a measured permanent set value of 37; the new material C had a measured permanent set value of 25; the new material D had a measured permanent set value of 24; and the new material E had a measured permanent set value of 24.

While the known baseline material A exhibited the lowest permanent set value during stretch testing, the extremely high gas transfer rate of the known baseline material A (see FIG. 2) nonetheless renders it undesirable for use in manufacturing an inner tube having the performance characteristics required according to the present invention. Also, while the new material B exhibited a low gas transmission rate (see FIG. 2), it also exhibited the highest permanent set value of the tested materials.

In light of the results obtained from gas transmission rate testing and stretch testing on the material samples, the new materials D and E were subsequently used to produce exemplary bicycle inner tubes, as was the known baseline material A. A number of exemplary inner tubes comprised of each selected material were placed in corresponding road bike tires, which tires were subsequently assembled to rims and inflated to a pressure of 70 psi. Monitoring was then conducted to determine the amount of time required for each tire (inner tube) to lose 10% of its inflated pressure.

Figures 5A, 5B:
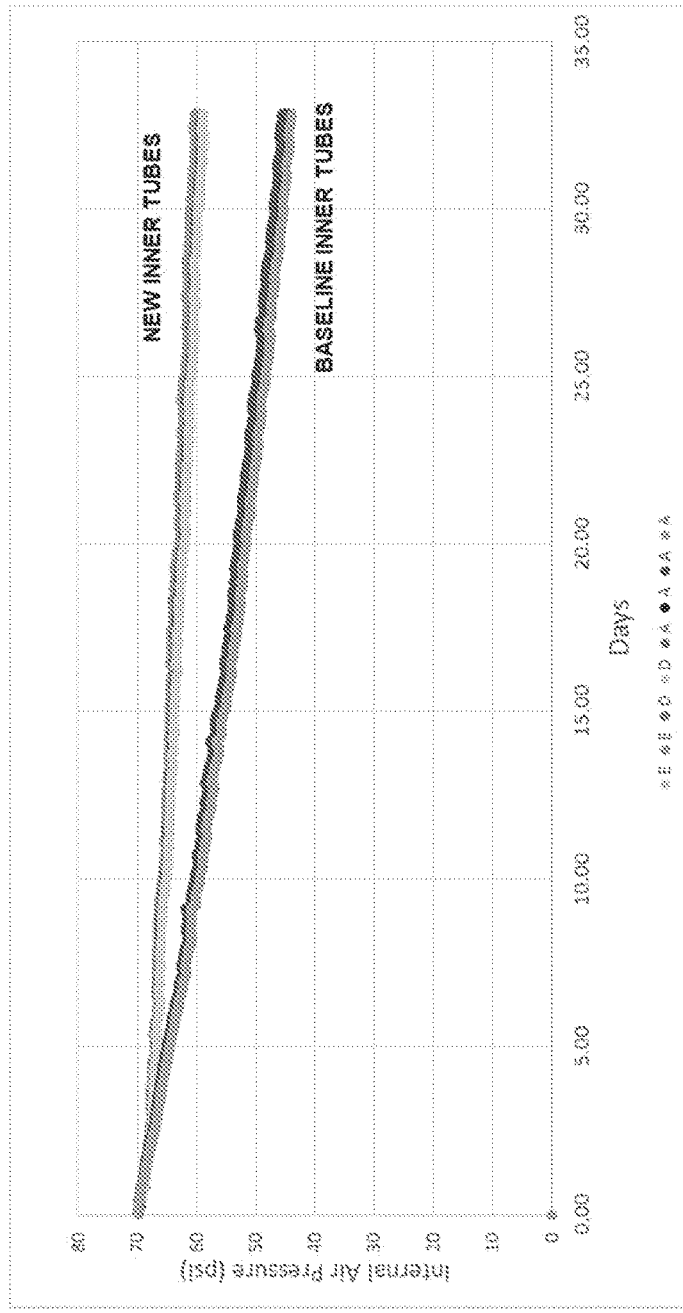
FIGS. 5A and 5B are a chart and table, respectively, that cooperatively indicate the time to 10% air loss for several exemplary bicycle inner tubes produced from three of the sample materials shown in FIG. 2 and inflated and placed in corresponding bike tires.

The results of the aforementioned pressure loss testing are presented in the graph of FIG. 5A and in Table 3 of FIG. 5B. It may be observed by reference to FIG. 5A that the tires having the exemplary inner tubes manufactured from each of the new materials D and E took significantly longer to lose 10% of their initial inflated air pressure than did the tires having the exemplary inner tubes manufactured from the known baseline material A.

More specifically, and referring now to Table 3 of FIG. 5B, it may be observed that the two tested tires having exemplary inner tubes manufactured from the new material E took 31.898 days and 31.910 days, respectively, or an average time of 31.90 days, to lose 10% of their initial 70 psi inflation pressure. Similarly, the two tested tires having exemplary inner tubes manufactured from the new material D took 29.965 days and 29.040 days, respectively, or an average time of 29.50 days, to lose 10% of their initial 70 psi inflation pressure. In contrast, the four tested tires having exemplary inner tubes manufactured from the known baseline material A (designated as "Std." in Table 3) took 9.977 days, 9.884 days, 10.266 days and 9.595 days, respectively, or an average time of 9.93 days, to lose 10% of their initial 70 psi inflation pressure. This indicates that the tires having the inner tubes produced from the new material E experienced a rate of air pressure loss that is 3.2 times better than the rate of air pressure loss experienced by the inner tubes produced from the known baseline material A, and the tires having the inner tubes produced from the new material D experienced a rate of air pressure loss that is 3.0 times better than the rate of air pressure loss experienced by the inner tubes produced from the known baseline material A.

An additional table of testing results (Table 4) is presented in FIG. 6. As shown, the first two columns of Table 4 reiterate the permanent set values and gas transmission rates, respectively, obtained from testing for each of the known baseline inner tube material A and the new inner tube materials B, C, D and E. Columns 3-5 of Table 4, however, present additional percentage air loss over time data for exemplary tire assemblies incorporating exemplary inner tubes produced from each of the known baseline material A and the new materials B, C, D and E.

Column 3 of Table 4 presents the percentage air loss experienced by certain ones of the exemplary tire assemblies over a five day period, after initial inflation to a pressure of 90 psi and during exposure to an environmental temperature of 25° C. Under said conditions, the tire assembly having an exemplary inner tube manufactured from the known baseline material experienced an 8.81% air loss over a five day period, while the tire assembly having an exemplary inner tube manufactured from the new material B experienced a 3% air loss over a five day period.

Column 4 of Table 4 also presents the percentage air loss experienced by certain ones of the exemplary tire assemblies over a five day period, but after initial inflation to a pressure of 70 psi and during exposure to an environmental temperature of 40° C. Under said conditions, the tire assembly having an exemplary inner tube manufactured from the known baseline material experienced a 7.31% air loss over a five day period, the tire assembly having an exemplary inner tube manufactured from the new material C experienced a 5.56% air loss over a five day period, the tire assembly having an exemplary inner tube manufactured from the new material D experienced a 4.56% air loss over a five day period, and the tire assembly having an exemplary inner tube manufactured from the new material E experienced a 4.39% air loss over a five day period.

Column 5 of Table 4 additionally presents the percentage air loss experienced by certain ones of the exemplary tire assemblies after initial inflation to a pressure of 70 psi and during exposure to an environmental temperature of 40° C., but over a longer 30 day period. Under said conditions, the tire assembly having an exemplary inner tube manufactured from the known baseline material experienced a 33.91% air loss over a thirty day period, the tire assembly having an exemplary inner tube manufactured from the new material C experienced a 15.96% air loss over a five day period, the tire assembly having an exemplary inner tube manufactured from the new material D experienced a 14.59% air loss over a five day period, and the tire assembly having an exemplary inner tube manufactured from the new material E experienced a 13.74% air loss over a five day period.

As may be observed from Table 4, all of the inner tubes manufactured from new materials B, C, D and E exhibited improved air retention in comparison to the inner tubes manufactured from the known baseline material A. While the inner tube manufactured from the new material B showed markedly improved air retention over the course of five days after initial inflation to a pressure of 90 psi, the higher permanent set value exhibited by said material made the inner tube manufacturing process difficult and the occurrence of defects increased. Nonetheless, the test results presented in Table 4 (and elsewhere herein) relative to exemplary inner tubes manufactured using the new materials C, D and E demonstrate that is possible to manufacture an inner tube having the desirable characteristics set forth above.

While certain embodiments of the invention are described in detail above, the scope of the invention is not considered limited by such disclosure, and modifications are possible without departing from the spirit of the invention as evidenced by the following claims.

What is claimed is:

1. An elastomeric inner tube, comprising:
a substantially toroidal shape having a hollow interior;
a gas transmission rate above 55 $cm^3/m^2$ and less than 69 $cm^3/m^2$ over 24 hours at atmospheric pressure;
a permanent set value above 22% and less than 27% after stretching to 300% strain; and
a wall thickness of between about 0.5 millimeters-2 millimeters.

2. The inner tube of claim 1, wherein the inner tube is manufactured from a butyl polymer composition.

3. The inner tube of claim 1, wherein the wall thickness is between 0.8 millimeters-1.2 millimeters.

4. The inner tube of claim 1, further comprising a valve providing a pathway by which air can be introduced into the hollow interior of the inner tube.

5. The inner tube of claim 1, wherein the butyl polymer composition further includes at least one filler and at least one pigment.

6. The inner tube of claim 5, wherein the at least one pigment filler is carbon black.

7. An elastomeric pneumatic inner tube for use inside a tire, the inner tube comprising:
an endless tubular wall forming a substantially toroidal shape with a hollow interior for containing air;
a wall thickness of between about 0.5 millimeters-2 millimeters; and
a valve providing a pathway through the tubular wall by which air can be introduced into the hollow interior of the inner tube;
wherein, the inner tube exhibits a gas transmission rate above 55 $cm^3/m^2$ and less than 69 $cm^3/m^2$ over 24 hours at atmospheric pressure, and a permanent set value above 22% and less than 27% of less than 30% after stretching to 300% strain.

8. The inner tube of claim 7, wherein the inner tube is manufactured from a butyl polymer composition.

9. The inner tube of claim 7, wherein the wall thickness is between 0.8 millimeters-1.2 millimeters.

10. The inner tube of claim 7, wherein the butyl polymer composition further includes at least one filler and at least one pigment.

11. The inner tube of claim 10, wherein the at least one pigment filler is carbon black.

* * * * *